(No Model.) 5 Sheets—Sheet 1.

P. LORILLARD, Jr., & O. S. HARMON.
MACHINE FOR TRIMMING AND BEVELING THE EDGES OF CARDS.

No. 349,351. Patented Sept. 21, 1886.

(No Model.) 5 Sheets—Sheet 2.

P. LORILLARD, Jr., & O. S. HARMON.
MACHINE FOR TRIMMING AND BEVELING THE EDGES OF CARDS.

No. 349,351. Patented Sept. 21, 1886.

Fig. 2.

Attest:
Geo. H. Graham
Geo. H. Botts

Inventors:
Pierre Lorillard Jr
Orrelle S. Harmon
by Munson & Philipp
Attys.

(No Model.) 5 Sheets—Sheet 3.

P. LORILLARD, Jr., & O. S. HARMON.
MACHINE FOR TRIMMING AND BEVELING THE EDGES OF CARDS.

No. 349,351. Patented Sept. 21, 1886.

Attest:
Geo. H. Botts.
Geo. C. Graham.

Inventors:
Pierre Lorillard Jr.
Orville S. Harmon
by Munson & Philipp
Atty's (No Model.) 5 Sheets—Sheet 4.

P. LORILLARD, Jr., & O. S. HARMON.
MACHINE FOR TRIMMING AND BEVELING THE EDGES OF CARDS.

No. 349,351. Patented Sept. 21, 1886.

Attest:
Geo. H. Bett.
G. W. Graham.

Inventor:
Pierre Lorillard Jr.
Oville S. Harmon
by Munson & Philipp
Atty's

UNITED STATES PATENT OFFICE.

PIERRE LORILLARD, JR., OF NEW YORK, AND ORVILLE S. HARMON, OF BROOKLYN, N. Y., ASSIGNORS TO P. LORILLARD & CO., OF JERSEY CITY, NEW JERSEY.

MACHINE FOR TRIMMING AND BEVELING THE EDGES OF CARDS.

SPECIFICATION forming part of Letters Patent No. 349,351, dated September 21, 1886.

Application filed March 28, 1885. Serial No. 160,412. (No model.)

*To all whom it may concern:*

Be it known that we, PIERRE LORILLARD, Jr., and ORVILLE S. HARMON, citizens of the United States, residing in New York, county of New York, State of New York, and Brooklyn, county of Kings, State of New York, respectively, have invented certain new and useful Improvements in Machines for Trimming and Beveling the Edges of Cards, fully described and represented in the following specification and the accompanying drawings, forming a part of the same.

This invention relates, generally, to that class of machines which are used for cutting paper, card-board, and other similar material, but more particularly to a machine of this class which is adapted for use in trimming and beveling or mitering the edges of cards and other similar thin sheets of material.

It is the object of the invention to provide a compact, simple, and effective machine for use in trimming the edges of cards and other similar thin sheets of material, whereby the trimmed edges may be cut square or beveled or mitered to any desired angle, and whereby also the corners may be rounded to any desired curve, whether the edges are cut square or beveled.

To these ends the invention consists in various details of construction in the cutting or trimming mechanism proper; also in the table or support upon which the material rests during the cutting operation, and also in the gages by which the material is held and guided during this operation.

The invention also includes various combinations of devices for effecting the desired results, all of which will be hereinafter fully explained and particularly pointed out.

In the accompanying drawings the invention is shown as embodied in a machine of suitable form and construction for trimming and beveling the edges of cards. Many parts of the invention are, however, applicable to other forms of cutting apparatus in which accurate work and quick manipulation are required.

In said drawings, Fig. 4 is a horizontal section of the same taken on the line $x\,x$ of Fig. 1.

Referring to said drawings, it is to be understood that the complete machine therein shown consists of two practically independent mechanisms—viz., the cutting mechanism proper, consisting of a rotary cutter and its supporting and adjusting devices and means for maintaining its cutting-edge in proper condition, and the mechanism for supporting, holding, guiding, and presenting the material in proper position to be acted upon by the cutter, consisting of a table for supporting the material, means for adjusting the table to different positions to vary the angle at which the edge of the material shall be cut, means for moving or feeding the material up to the cutter as the cutting progresses, and means for guiding the material and for holding it in proper position during the cutting operation. These two mechanisms are supported upon a main framework, A, of suitable form and construction to receive the various parts, the latter mechanism being mounted directly upon the main frame-work, while the former is mounted upon a supplemental frame, B, which is vertically adjustable upon the main frame A in such manner as to permit the cutting mechanism to be adjusted to different positions vertically of the machine.

The supplemental frame B, which carries the cutting mechanism, is of rectangular form, and is composed of two upright and two or more horizontal pieces, b, and is arranged to be moved up and down between guides 50, formed upon upright pieces a, which form a part of the frame A, it being held against the faces of the pieces a by bolts 94, which pass through the upright pieces b and move up and down in slots 93, formed in the upright pieces a. The frame B is supported and adjusted by means of a screw-rod, 96, which is supported in a tie-piece connecting the upright pieces a, and works in a nut, 95, formed in one of the horizontal pieces b.

The cutting mechanism proper consists of a revolving cutting-disk, 99, which is beveled or ground upon one edge, so as to bring the cutting-edge flush or in line with one of its faces, and an abrading or grinding wheel, 98, which is arranged to run in contact with the beveled edge of the cutting-disk, so as to keep it constantly sharpened. In addition to these there may also be provided a smoothing or polishing roll, 97, which is arranged to run in contact with the opposite edge of the disk, so as to remove any burr or feather-edge which may be formed by the grinding-wheel.

Figure 1:
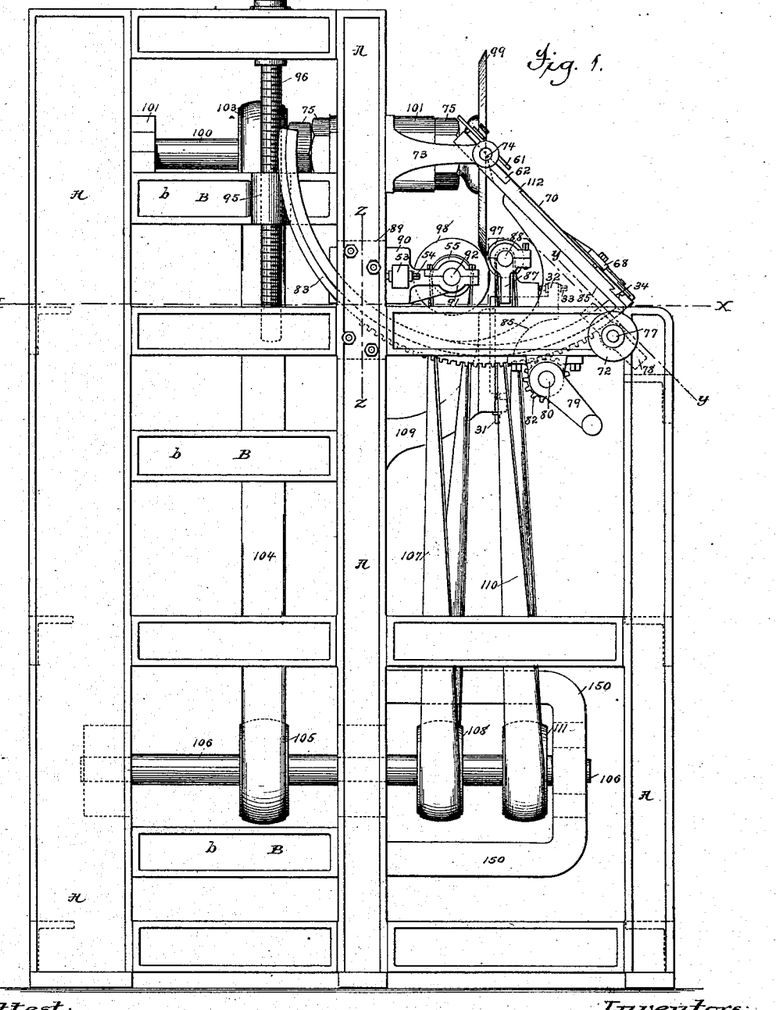
Figure 1 is a side elevation of the machine.
Figures 3, 6, 11, 13:
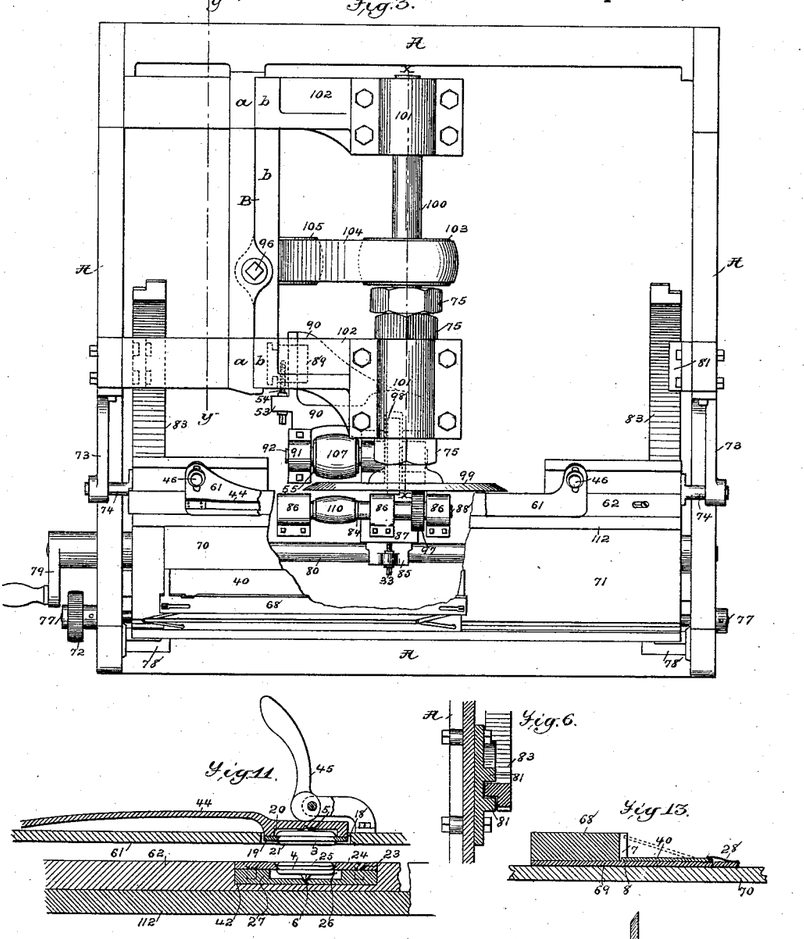
Fig. 3 is a plan view of the same, also showing a portion of the table and the feed-gage broken away.
Fig. 6 is a sectional detail, taken on the line $z\,z$ of Figs. 1 and 4, showing one of the table-racks and its supporting-guide.
Fig. 11 is an enlarged view of a portion of Fig. 9, showing a slight modification in the device for holding and guiding the card while its corners are being rounded.
Fig. 13 is an enlarged section taken upon the line $z\,z$ of Fig. 7.
Figure 5:
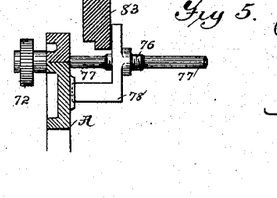
Fig. 5 is a sectional detail taken on the line $y\,y$ of Fig. 1, showing particularly the means for securing the table in a fixed position.
Figure 14:
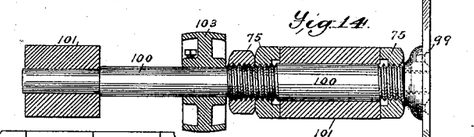
Fig. 14 is a section taken upon the line $x\,x$ of Fig. 3.
Figure 15:
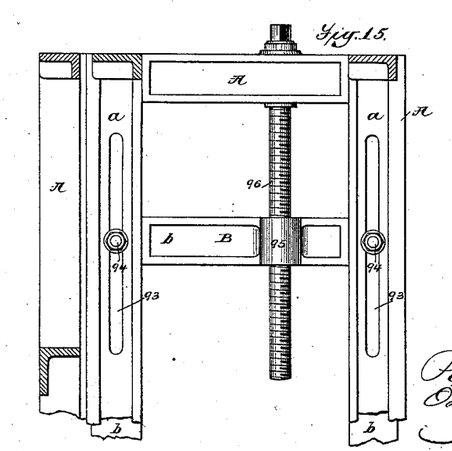
Fig. 15, a section taken upon the line $y\,y$ of the same figure, showing the means for adjusting the frame carrying the cutting apparatus proper.

The cutting-disk 99 is mounted upon the end of a shaft, 100, which is journaled in bearings 101, formed in the ends of arms or brackets 102, extending from the upper portion of the upright pieces b of the frame B, and is provided with a belt-pulley, 103, by which it and the cutter are driven from a belt, 104, which passes around a pulley, 105, upon a shaft, 106, which is mounted in bearings in the lower part of the frame B and in a bracket, 150, secured to the frame, and receives motion from any suitable source of power. In order to compensate for any slight wear and to always hold the cutter 99 up to its work, the shaft 100 is provided with threaded portions and with adjusting-nuts 75, arranged upon opposite sides of one of the bearings 101, as shown in Figs. 1, 3, and 14, by which it can be adjusted longitudinally to a limited extent, and held securely against any pressure which may be brought to bear against the cutter.

Figure 2:
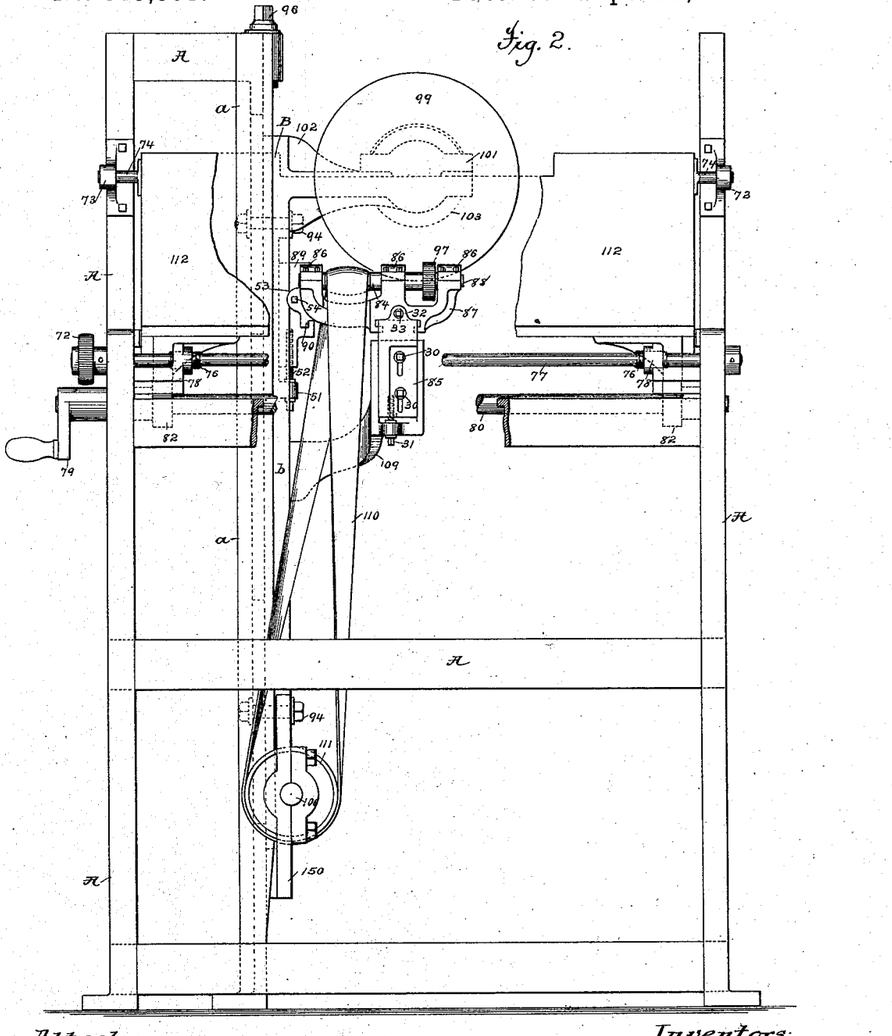
Fig. 2 is a front elevation of the same, the feed-gage being omitted and a portion of the material-supporting table broken away to show underlying parts.

The grinding-wheel 98 is mounted upon a shaft, 92, which is supported in bearings 91, formed in the arms of a bracket, 90, which is supported in a horizontal dovetail-bearing (see Figs. 1, 2, and 3) formed in a head, 89, which in turn is mounted in a vertical dovetail-bearing (see Figs. 3 and 4) formed in the inner one of the upright pieces b of the frame B. The piece b, on which the head 89 is mounted, is provided with a projection, 51, (see Fig. 2,) in which is mounted an adjusting-screw, 52, which works in a nut formed in the head 89, and by which the head can be moved up and down in its bearings, so as to adjust the grinding-wheel 98 to any desired height to bring and keep it in contact with the cutter 99 as the latter is reduced in size by wear. The bracket 90 is provided with a projection, 53, (see Figs. 1, 2, and 3,) in which is mounted an adjusting-screw, 54, which works in a nut formed in the head 89, and by which the bracket can be moved horizontally in its bearings in the head, so as to carry the grinding-wheel 98 to and from the cutter 99, to compensate for the wear of the wheel and to cause it to bear against the cutter with any desired degree of pressure. The shaft 92, upon which the grinding-wheel 98 is mounted, is provided with a pulley, 55, around which passes a belt, 107, which is driven by a pulley, 108, upon the shaft 106, and thus gives motion to the grinding-wheel.

The smoothing-roll 97 is mounted upon a shaft, 88, which is supported in bearings 86, formed in a frame, 87, which is supported by means of a dovetail bearing upon a head, 85, which in turn is mounted upon a bracket, 109, extending from the inner one of the upright pieces b of the frame B, below the head 89. The head 85 is secured to the bracket 109 by means of bolts 30, (see Fig. 2,) which pass through elongated openings in the head, so as to permit of its being moved up and down to carry the polishing-roll to different heights, to compensate for the wearing away of the cutter, and the bracket 109 is provided with an adjusting-screw, 31, which works in a nut formed in the head, and by which the head can be moved up and down to effect the adjustment just stated. The head 85 is provided with a projection, 32, in which is mounted an adjusting-screw, 33, which works in a nut formed in the frame 87, and by which the frame can be moved horizontally, so as to keep the smoothing-roll in proper position with relation to the cutter and cause it to bear upon the cutter with the proper amount of pressure. The shaft 88, upon which the roll 97 is mounted, is provided with a pulley, 84, around which passes a belt, 110, which is driven from a pulley, 111, upon the shaft 106, and thus communicates motion to the roll.

The mechanism for supporting, holding, guiding, and presenting the material in proper position to be acted upon by the cutter consists of a hinged or tilting table, 112, which is constructed, arranged, and equipped as follows: This table is located directly in front of the cutter 99, and is supported at its inner edge, which is in close proximity to the face of the cutter, upon trunnions 74, which extend from the corners of the table and rest in bearings formed in the ends of arms 73, extending from the frame A, and at its outer edge by curved racks 83, which are secured to the under side of the table and move in guides 81 upon the frame A, and are engaged by pinions 82, mounted upon a shaft, 80, which is supported in bearings in the frame A, and is provided with a crank, 79, by which it can be operated so as to move the racks, and thus raise and lower the outer edge of the table and cause it to assume different angles with relation to the face of the cutter. The purpose of this will hereinafter appear.

In order to secure the table 112 in any position to which it may be adjusted, there are provided two friction-clamps, 78, which are guided in openings formed in the frame A, and are arranged to bear against the sides of the racks 83 in such manner as to clamp and hold the racks, and with them the table 112, in any desired position. The clamps 78 are operated by a rod, 77, which passes through the clamps, and is provided with right and left hand screws 76, (see Figs. 2 and 4,) and with a handle, 72, by which it can be operated so as to force the clamps against the racks and hold them in any position.

It is to be remarked in passing that the devices for supporting and adjusting the table 112 and the cutting-disk 99, so as to bring them into proper relation to each other, may be varied widely without departing from the invention. The racks 83, instead of being curved, as shown, may be straight, they being pivoted to the table and arranged to move in guides which will permit them to accommodate themselves to the different positions of the table. When the racks are of the curved form shown, and are provided with suitable guides, the table 112 need not be hinged at its upper or inner edge, as in such case the table may be supported entirely by the racks. The clamps 78 may also be greatly varied without departing from the invention.

Figure 10:
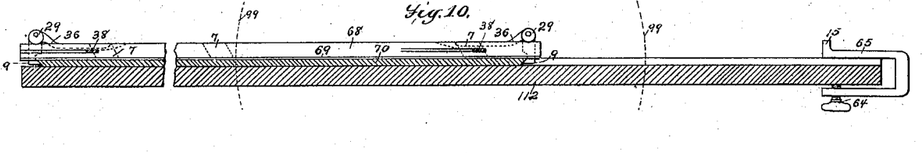
Fig. 10 is a similar view taken on the line $y\,y$ of the same figure.

The table 112 is provided upon its upper face with a shallow recess or depression, 71, in which rests a plate or carriage, 70, which is arranged to move freely back and forth in the recess 71, and is guided and held in position by a dovetail rib, 34, (see Fig. 8,) formed upon its under side, and which fits into a correspondingly-shaped groove, 35, (see Fig. 7,) formed in the bottom of the recess 71. The moving plate 70 is provided upon its upper side with a movable plate, 69, (see Figs. 8, 10, and 13,) upon the upper side of which is fixed a feed-gage consisting of a bar, 68, which extends longitudinally of the plates 69 and 70, and a wing, 67, which projects from the outer end of the bar 68 and at right angles thereto. The ends of the plate 70 are beveled upon the under side, and the ends of the plate 69 and bar 68 are provided with clamps 29, (see Figs. 7 and 10,) which move freely in openings in the ends of the bar and plate, and are provided at their lower ends with catches 9, which project beneath the beveled ends of the plate 70, (see Fig. 10,) and at their upper ends with cam-levers 36, by which they can be raised so as to force the catches 9 against the ends of the plate 70 and lock the gage in any desired position upon the plate. In order that the levers 36 may not form an objectionable projection above the bar 68, the latter is recessed, as shown at 37, so that when the gage is secured in position the handles of the levers may lie below the upper surface of the bar, as shown in Fig. 10.

In order that both ends of the plate 69 and bar 68 may always be moved the same distance, so that the gage will preserve its parallel relation to the plate 70 and table 112, they are provided with a pair of pivoted arms, 38, (see Figs. 7, 8, and 10,) which are connected to a pair of similar arms, 39, pivoted to the plate 70, near its rear edge, and these two pairs of pivoted arms are connected at their points of union by a rod, 66. From this arrangement it results that whenever the clamps 29 are loosened and the gage moved it must always be moved the same distance at each end, thereby causing it to always preserve its parallel relation to the plate 70 and table 112.

In addition to the feed-gage 68 67, the plate 69 is provided with a thin plate, 40, (see Figs. 7 and 13,) which lies loosely upon the upper side of the plate just in front of the bar 68. This plate 40 is covered at its front edge by a thin strip, 28, secured to the plate 69, and is provided at its rear edge with one or more short projections, 8, which rest in the inclined recesses 7, formed in the inner or front edge of the bar 68. The purpose of this arrangement will be made clear when the operation of the mechanism is described.

The plate 70 does not extend the entire length of the table 112, and the end of the table is provided with a stop, 65, by which the movement of the plate 70 is limited in that direction. The stop 65 is secured in position by means of a set-screw, 64, which impinges against the bottom of the table, and by which it can be shifted to different positions, so as to vary the movement of the plate 70.

Figure 7:
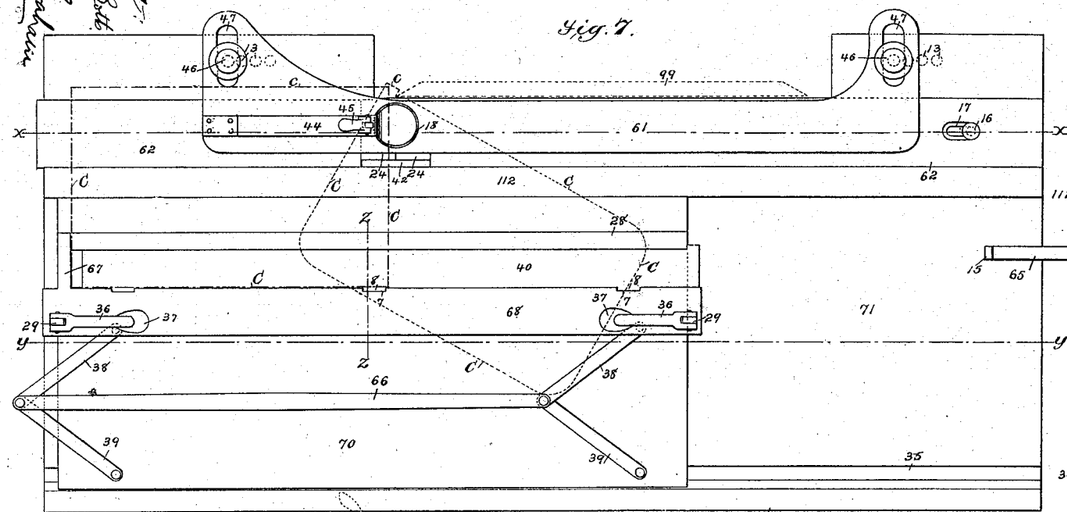
Fig. 7 is an enlarged plan view of the table and the feed-gage, and its auxiliaries for holding the material in position during the cutting operation.
Figure 8:
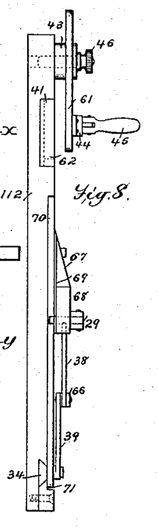
Fig. 8 is an end elevation of the same.

The plate 40 is arranged so that as it rests flat upon the plate 69 its end extends slightly beyond the plates 69 70, as shown in Fig. 7, and the stop 65 is provided with an upwardly-projecting stud, 15, which, as the plate 70 approaches the stop, engages with the end of the plate 40 in advance of the engagement of the plate 70 with the stop. The purpose of this arrangement will also be made clear when the operation of the mechanism is described.

Figure 12:
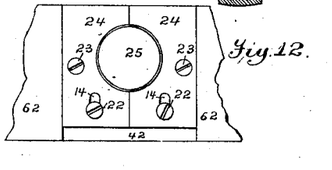
Fig. 12 is a plan view upon the same scale of the lower member of said device.

In addition to the devices already described, the table 112 is provided at its inner edge with a longitudinal recess, 41, in which is located a sliding plate, 62, which is secured in position by means of a set-screw, 16, which passes through a slot, 17, formed in the plate, so as to permit the latter to be moved to different positions longitudinally of the table. The plate 62 is provided at a point opposite the edge of the cutter 99 with a recess, 42, (see Figs. 7, 11, and 12,) in which is located a small plate, 27, which in turn is provided with a shallow recess, 26, in which is seated a button, 25, which is arranged to turn freely, and is supported upon a pivot-point, 6, which rests upon the bottom of the recess 26. The button 25 is held in position in the recess 26 by means of a halved plate, 24, having an opening, the edge of which fits into a groove, 4, in the edge of the button. The halves of the plate 24 are secured to the plate 27 by means of screws 23, (see Fig. 12,) and the plates 27 24 and the button 25 are secured in the recess 42 by means of set-screws 22, which pass through elongated openings 14, and thus afford means by which the button 25 can be adjusted in and out to different positions with relation to the edge of the table. The button 25 is so arranged that its upper face projects very slightly above the surface of the plate 24.

The parts just described form one member of the device by which the card or other material is clamped and held during the operation of rounding its corners. The other member of this device is mounted upon a plate, 61, which is supported upon washers 43, (see Fig. 8,) so as to be raised a short distance from the table 112, to permit the material to lie between it and the table during the cutting operation. This member of the clamping device is similar to the one just described. It consists of a button, 21, which is arranged directly above the button 25, and rests in a recess, 20, formed in the end of a spring-arm, 44, which is secured to the upper side of the plate 61, as best shown in Figs. 7 and 11. The button 21, like the button 25, is arranged to turn freely upon a pivot-point, 5, which rests upon the bottom of the recess 20. This button, like the first, is held in position by means of a halved plate, 19, having an opening, the edge of which rests in a groove, 3, formed in the edge of the button. The free end of the arm 44, in which the button 21 is mounted, is bent downward and rests in an opening, 18, formed in the plate 61, and the latter plate is provided with a small cam-lever, 45, by which the spring-arm 44 and button 21 can be depressed, so as to clamp and hold the material lying upon the table between the two buttons 21 25 while the corners are being rounded, as will be presently explained.

Figure 9:
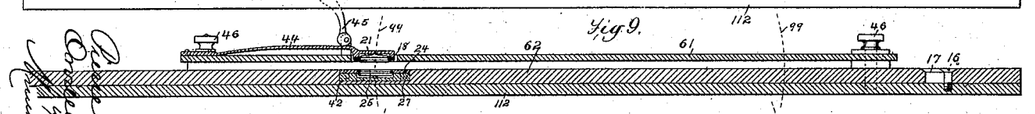
Fig. 9 is a longitudinal section of the same taken on the line $x\,x$ of Fig. 7.

The cam-lever 45 may be arranged, as shown in Figs. 7 and 9, to act upon the spring-arm 44 at a short distance from the button 21, or it may be arranged, as shown in Fig. 11, to act upon the arm directly over the button. The latter arrangement will usually be found the best.

The plate 61 is secured to the table 112 by means of set-screws 46, which pass through wide slots 47, formed in the plate, and enter holes 13 in the table. By reason of the width of the slots 47, and by the use of the different ones of the holes 13, the plate 61 can be moved longitudinally to correspond with the longitudinal movement of the plate 62, while, by reason of the length of the slots 47, the plate 61 can be moved to and from the edge of the table to correspond with the movement of the plates 27 24 in the recess 42. By this means the buttons 21 25, forming the two members of the clamping device, can always be kept in the proper relation to each other.

The construction just described embodies the clamping device for holding the card during the operation of rounding the corner in what is regarded as its most complete and desirable form. In some cases, however, one of the buttons, 21 or 25, may be omitted, the other of the buttons being arranged to clamp the sheet of material against a fixed surface. In such case one member of the clamping device will turn with the sheet, while the sheet will turn upon the other member of the device.

The operation of the complete mechanism is as follows: Before commencing the cutting operation the crank 79 will be operated so as to adjust the table 112 to the proper angle with relation to the face of the cutter 99, to give the proper form to the edge of the material which is to be trimmed. If the edge is to be square, the table will be raised into a horizontal position; but if the edge is to be beveled the table will be adjusted to the proper incline to give the desired bevel to the trimmed edge of the material. The table having been adjusted to the proper position, it will be secured there by the clamps 78. The cam-levers 36 will then be turned up and the plate 69 will be moved until the bar 68 is at the proper distance from the face of the cutter, after which the cam-levers will be again turned down, so as to lock the plate 69 and the gage in position. The cam-lever 45 will be raised and turned inward, so as to allow the buttons 21 25 to separate, and if the corners of the material are not to be rounded the stop 65 will either be entirely removed or will be adjusted to such a position that it will not arrest the plate 70 until after the cutter has trimmed the entire edge of the material. The card or other sheet of material, C, which is to be trimmed will then be placed upon the table beneath the plate 61, and with its edges resting against the portions 68 67 of the gage, as shown by broken lines in Fig. 7. The shaft 106 being then set in motion so as to revolve the cutter 99, the plate 70 will be moved by hand from left to right, thereby feeding the sheet C against the rapidly-revolving cutter and causing its edge $c$ to be trimmed off, leaving the new edge either square or beveled, according to the position to which the table 112 is adjusted. After the first sheet has been trimmed in this manner it will be removed and the plate 70 will be brought back by hand to its original position, after which another sheet will be placed in position and the operation repeated. As the trimming progresses the grinding-wheel 98 and polishing-roll 97, running in contact with the cutter 99, will keep its edge in proper cutting order, these parts being adjusted from time to time to compensate for wear, as before explained. If at any time it is desired that the material shall be presented to the cutter at a different point, vertically of the same, the frame B, carrying the cutting apparatus, may be raised or lowered by the screw-rod 96, so as to effect this result. If, in addition to trimming the edges of the sheet C, it should be desired to round its corners, the stop 65 will be secured in such position that its stud 15 will strike against the plate 40, and also in such position that it will arrest the plate 70 as soon as the sheet C has been trimmed to the point where it is desired that the rounding of the corner shall commence. This being done, the sheet C will be placed in position, the same as already described, and the plate 70 will be moved to the right until it is arrested by the stop 65. Just before the plate 70 is thus stopped the end of the plate 40 will come into engagement with the stud 15, so that as the plate 70 completes its movement the plate 40 will be slid backward along the plate 69, thereby causing the projections 8 to ride upward along the inclined sides of the recesses 7 and the plate to assume the inclined position shown by dotted lines in Fig. 13. As soon as the plate 70 has been arrested by the stop 65 the cam-lever 45 will be turned down from the position shown in Fig. 11, so as to force the buttons 21 25 together and clamp the corner of the sheet C between them. The sheet C will then be turned by hand upon the pivot formed by the points 5 6, thereby causing the corner to be rounded off by the cutter, as indicated by the dotted lines in Fig. 7, and this will be effected in the same manner, no matter whether the edge of the sheet is being cut square or beveled. By the raising or tilting of the plate 40, as already described, the lower or outer edge of the sheet C is automatically raised above the bar 68, so that no obstruction is offered to its being freely turned by hand while it is held clamped between the buttons 21 25. One side and corner having been trimmed and rounded in this manner, the sheet will be removed, the plate 70 restored to its original position by hand, another sheet placed in position, and the operation repeated.

If, after operating upon one edge of the sheet, as just described, the opposite edge is to be simply beveled without reducing the sheet in width, it may be reversed and its opposite edge operated upon without shifting the feed-gage. If, however, the opposite edge of the sheet is to be trimmed, the feed-gage will be shifted to the proper position before the second operation. By means of the slots 14 47, the buttons 21 25 can be moved in and out within certain limits, so as to vary the curvature of the rounded corners.

In conclusion, it is to be remarked that certain parts of the mechanism hereinbefore described may be used without the other parts. For example, if it is desired that the machine shall always leave the trimmed edges of the sheet square or beveled to the same angle, the table 112 may be made stationary. If it is not desired that the machine shall be capable of rounding the corners of the sheet, the devices for clamping the sheet during this operation may be omitted. If it is desired that the machine shall only be capable of rounding the corners of the sheet without trimming its edges, the table 112 may be omitted, simple supports for the clamping devices alone being provided.

What we claim is—

1. The combination, with the driven rotary cutting-disk 99, which is beveled or ground upon one edge, so as to bring its cutting-edge flush or in line with one of its faces, of the material-supporting table arranged along the face of the disk next to its cutting-edge, one of said parts being vertically adjustable with relation to the other, substantially as described.

2. The combination, with the driven rotary cutting-disk 99, mounted in the vertically-movable frame B, and beveled or ground upon one edge, so as to bring its cutting-edge flush or in line with one of its faces, of the material-supporting table arranged along the face of the disk next to its cutting-edge, substantially as described.

3. The combination, with the driven rotary cutting-disk 99, which is beveled or ground upon one edge, so as to bring its cutting-edge flush or in line with one of its faces, of the material-supporting table arranged along the face of the disk next to its cutting-edge, and the grinding-wheel 98, arranged to run in contact with the beveled edge of the disk, substantially as described.

4. The combination, with the driven rotary cutting-disk 99, which is beveled or ground upon one edge, so as to bring its cutting-edge flush or in line with one of its faces, of the material-supporting table arranged along the face of the disk next to its cutting-edge, and the grinding-wheel 98, arranged to run in contact with the beveled edge of the disk, and the smoothing-roll 97, arranged to run in contact with the face of the disk, said disk, wheel, and roll being mounted upon the vertically-adjustable frame B, so as to be moved together, substantially as described.

5. The combination, with the driven rotary cutting-disk 99, mounted in the vertically-movable frame B, and beveled or ground upon one edge, so as to bring its cutting-edge flush or in line with one of its faces, of the material-supporting table arranged along the face of the disk next to its cutting-edge, and the grinding-wheel 98, arranged to run in contact with the beveled edge of the disk, and the smoothing-roll 97, arranged to run in contact with the face of the disk, said wheel and roll being both vertically and horizontally adjustable with relation to the cutting-disk, substantially as described.

6. The combination, with the driven rotary cutter 99, which is beveled or ground upon one edge, so as to bring its cutting-edge flush or in line with one of its faces, of the material-supporting table 112, arranged along the face of the disk next to its cutting-edge, and made adjustable to different angles with relation to the face of the cutter, and the movable feed-gage, which travels with the material as it is presented to the cutter, substantially as described.

7. The combination, with the driven rotary cutter 99, of the tilting table 112, provided with the adjusting-racks 83 and pinions 82, substantially as described.

8. The combination, with the driven rotary cutter 99, of the tilting table 112, provided with the adjusting-racks 83 and pinions 82, and the locking-clamps 78, substantially as described.

9. The combination, with the driven rotary cutter 99, of the table 112, arranged along the face of the cutter, and having the movable plate or carriage 70, carrying the feed-gage 68 67, substantially as described.

10. The combination, with the driven rotary cutter 99, of the table 112, arranged along the face of the cutter, and having the movable plate or carriage 70, carrying the feed-gage 68 67, having the locking-clamps 29, substantially as described.

11. The combination, with the table 112, of the movable plate or carriage 70, the movable feed-gage 68 67, provided with the locking-clamps 29 and the guiding-arms 38 39, and the rod 66, substantially as described.

12. The combination, with the movable plate or carriage 70, of the plate 69 and bar 68, the latter having the inclined recesses 7, the movable plate 40, having the projections 8, and the stop 65, substantially as described.

13. The combination, with the driven rotary cutter 99, of a pivoted button, as 21, arranged to be clamped against the sheet to hold it and form a pivot upon which it is turned to present its corner to the cutter, substantially as described.

14. The combination, with the driven rotary cutter 99, of the clamping device consisting of the two pivoted buttons 21 25, which clamp the sheet and form a pivot upon which it is turned to present its corner to the cutter, substantially as described.

15. The combination, with the cutter 99 and the table 112 and the movable plate or carriage 70, of a clamping device for clamping and holding the sheet while the corner is being rounded, substantially as described.

16. The combination, with the driven rotary cutter 99 and table 112, of the pivoted buttons 21 25, forming the two members of the clamping device for clamping and holding the sheet while the corner is being rounded, substantially as described.

17. The combination, with the cutter 99 and the table 112, of the clamping device for clamping and holding the sheet while the corner is being rounded, the two members of the clamping device being adjustable in two directions, substantially as described.

In testimony whereof we have hereunto set our hands in the presence of two subscribing witnesses.

PIERRE LORILLARD, Jr.
ORVILLE S. HARMON.

Witnesses:
C. A. LEONARD,
GEO. D. FINLAY.